United States Patent [19]

Hobes et al.

[11] Patent Number: 5,492,990
[45] Date of Patent: Feb. 20, 1996

[54] COPOLYMERS OF ETHYLENE

[75] Inventors: John V. Hobes, Dinslaken; Wilhelm Zoller, Oberhausen, both of Germany

[73] Assignee: Hoechst Aktiengesellschaft, Germany

[21] Appl. No.: 293,740

[22] Filed: Aug. 22, 1994

Related U.S. Application Data

[63] Continuation of Ser. No. 108,336, Aug. 18, 1993, abandoned.

[30] Foreign Application Priority Data

Aug. 22, 1992 [DE] Germany .......... 42 27 905.4

[51] Int. Cl.$^6$ .................................................. C08F 222/10
[52] U.S. Cl. .......................... 526/324; 526/348; 526/331
[58] Field of Search .................................. 524/324, 321, 524/331, 348

[56] References Cited

U.S. PATENT DOCUMENTS 4,129,714  12/1978  Colburn et al. .................. 526/331
4,657,821  4/1987  Ura et al. ......................... 428/510

FOREIGN PATENT DOCUMENTS 2057464  6/1952  Canada .
295727  12/1988  European Pat. Off. .
493769  7/1992  European Pat. Off. ...... C08F 210/02
2047355  5/1971  Germany ...................... C08F 15/02
2102469  8/1972  Germany ...................... G08F 15/02

*Primary Examiner*—Jeffrey T. Smith
*Attorney, Agent, or Firm*—Jordan B. Bierman; Bierman and Muserlian

[57] ABSTRACT

Copolymers of ethylene, a vinyl ester of a tertiary saturated monocarboxylic acid and optionally a further monomer, and a process for making them. The copolymers are suitable for producing films of high mechanical strength and excellent optical properties.

10 Claims, No Drawings

COPOLYMERS OF ETHYLENE

This application is a continuation of application Ser. No. 07/108,336 filed Aug. 18, 1993, now abandoned.

This Application claims the priority of German Application P42 27 905.4, filed Aug. 22, 1992.

The invention relates to copolymers of ethylene, a vinyl ester of a tertiary saturated monocarboxylic acid and optionally a further monomer, a process for preparation thereof, and their use for producing film.

BACKGROUND OF THE INVENTION

Film made of thermoplastic polymer is extensively used in particular as packaging material, covering for goods and plant beds, and—combined with other films—as a laminate. The starting materials are homopolymers, for example those polyethylenes of low, medium and high density, or copolymers of ethylene with one or more monomers, such as mono-alpha-olefins, alkenecarboxylic acids, alkenecarboxylic esters, or vinyl acetate.

The key to their versatility is a number of properties, among which mechanical, thermal, and optical characteristics are of particular importance. Accordingly, the polymerization conditions and the qualitative or quantitative composition of the monomer mixture being polymerized have been varied in numerous ways to meet different practical film requirements.

According to EP-B-82,502, ethylene copolymers are prepared by continuous polymerization of a monomer mixture comprising 95.9% to 99% by weight of ethylene; 0.3% to 4.0% by weight of vinyl acetate and/or vinyl propionate; 0.1% to 3.5% by weight of saturated aliphatic aldehydes having 2 to 5 carbon atoms in the alkyl moiety, saturated aliphatic ketones having 1 or 2 carbon atoms in the alkyl moiety, alkenes having 3 to 6 carbon atoms, and/or cyclohexene. The reaction is carried out in a tubular reactor at a pressure of 100 to 400 MPa and 190° and 270° C. by introducing 30% to 70% by weight of the monomer mixture at the start of the tubular reactor and the remainder at two or more points downstream thereof. The film obtained from the copolymers is suitable in particular for manufacture of large bags.

DE-A-1,924,823 describes, in Example 4, a terpolymer of ethylene, 5.0% by weight of vinyl acetate, and 1.5% by weight of propylene. In the form of a packaging and wrapping film 0.025 mm in thickness, this terpolymer exhibits excellent optical properties, stiffness, and breaking strength.

DE-B-2,018,718 concerns a process for producing modified high pressure polyethylenes wherein polymerization of ethylene, and optionally of other compounds which are copolymerizable with ethylene, is carried out in the presence of oligomers of isobutylene having 4 to 100 isobutylene units. The polymers obtained by this process are suitable for producing film that is free of surface tackiness which is responsible for blocking.

SUMMARY OF THE INVENTION

It is an object of the present invention to provide copolymers which are processible into film having high strength and excellent optical properties.

The invention consists of copolymers of ethylene which comprise, based on the total copolymer, 5% to 50% by weight of a vinyl ester of a tertiary saturated monocarboxylic acid and optionally 5% to 30% by weight of a further, copolymerizable monomer, the melt flow index (190/2.16) of the copolymers being from 0.1 to 50 g/10 min.

The copolymers of the invention result in film which, compared with film of ethylene/vinyl acetate copolymers, is notable for higher toughness and Shore hardness and an improved Vicat softening point, while having at least the same excellent optical properties.

DETAILED DESCRIPTION OF THE INVENTION

An essential feature of the copolymers of the invention is that they contain a vinyl ester of a tertiary saturated monocarboxylic acid as comonomer. Tertiary saturated monocarboxylic acids are compounds which contain a carboxyl group bonded to a tertiary carbon atom. They are prepared by a Koch carboxylic acid synthesis from olefins, carbon monoxide, and water and are commercially available under the name Versatic acids. The vinyl esters are obtained for example, by reacting the acids with acetylene. Examples of tertiary saturated monocarboxylic acids are 2,2-dimethylpropionic acid (pivalic acid); 2,2-dimethylbutyric acid; 2,2-dimethylpentanoic acid; 2,2-dimethylhexanoic acid; 2,2-dimethylheptanoic acid (neononanoic acid); and 2,2-dimethyloctanoic acid (neodecanoic acid). Preferred comonomers are vinyl esters derived from pivalic acid; 2,2-dimethylheptanoic acid; and 2,2-dimethyloctanoic acid.

The proportion of the vinyl ester units in the copolymer is from 3% to 50% by weight, based on the copolymer; preferably the proportion is from 5% to 35% by weight, in particular from 7% to 30% by weight.

In addition to ethylene and a vinyl ester of a tertiary carboxylic acid, the copolymers of the invention may contain a further comonomer. Suitable comonomers are the vinyl esters of unbranched saturated monocarboxylic acids, in particular those having 2 to 4 carbon atoms; alkenecarboxylic acids; and esters thereof with saturated aliphatic alcohols having 1 to 8 carbon atoms. The alcohols can be straight or branched chain and carry the OH group on a primary, secondary, or tertiary carbon atom. Examples of such compounds are vinyl acetate, vinyl propionate, acrylic acid, methyl acrylate, ethyl acrylate, n/i-butyl acrylate, and 2-ethylhexyl acrylate. Preference is given to vinyl acetate and/or methyl acrylate. The proportion of this further comonomer unit in the copolymer is from 5% to 30% by weight, based on the copolymer, preferably from 5% to 15% by weight.

The copolymers of the invention are additionally characterized by a melt flow index MFI (190/2.16) of from 0.1 to 50 g/10 min., in particular from 0.2 to 25 g/10 min. determined in accordance with DIN 53735. Every measured melt flow index correlates empirically with a certain average molecular weight determined by gel permeation chromatography.

The claimed binary and ternary copolymers of ethylene can be prepared by copolymerization of the monomers at 50 to 350, preferably 100 to 300, MPa and 100° to 350° C., preferably 120° to 325° C. in the presence of oxygen or a free-radical former Since, in general, the polymerization rates of the monomers differ, the composition of the polymer will differ from the composition of the monomer mixture.

The polymerization initiators used are oxygen or free-radical formers. The free-radical formers include organic peroxides, hydroperoxides, and azo compounds. Of the organic peroxides, tert-butyl perbenzoate, tert-butylperoxypivalate, bis(2-ethylhexyl) peroxydicarbonate, and dilauroyl peroxide have proven useful. A good azo compound to use is azobis(isobutyronitrile). Of particular usefulness are tert-butyl peroxypivalate and bis(2-ethylhexyl)peroxydicarbonate. The compounds can be used alone or mixed. The polymerization initiators are used in a concentration of 3 to 50, preferably 5 to 40, in particular 10 to 25, weight ppm, based on the ethylene. They are introduced into the polymerization directly or as a solution in an organic solvent. The solvents used are hydrocarbons such as isooctane, benzene, toluene, or gasoline fractions.

The melt flow index of the terpolymer of the invention—and hence its average molecular weight—is controlled for a given composition of the monomer mixture by varying the reaction parameters (pressure and temperature) and optionally by adding a molecular weight regulator. Molecular weight regulators are compounds which are added to the monomers in various concentrations in order to influence the growth of the polymeric molecule and hence the molecular weight of the polymer. Molecular weight regulators include representatives of a wide range of chemical classes. Examples are hydrogen, alkanes, unbranched alpha-olefins, alcohols, aldehydes, and ketones (cf. Fortschr. Hochpolym.-Forschg. 7(3), 386–448). Propionaldehyde is particularly good. The molecular weight regulators are used in amounts of 0.05 to 10% by weight, based on the monomer mixture.

The copolymers of the invention can be prepared in known high pressure reactors. These include autoclaves equipped with stirrers and tubular reactors (cf. Ullmanns Encyclopadie der Technischen Chemie, 4th Edition, Verlag Chemie Weinheim-Basle 1980, volume 19, pages 169, 172 to 175). If a tubular reactor is used—the preferred option for polymerization on an industrial scale—the entire monomer mixture, including the initiators, can be introduced at the reactor inlet in one stream. However, it is particularly advantageous to use a tubular reactor having a cold gas and initiator replenishment facility and to divide the monomer mixture into at least two streams. One stream is then introduced at the reactor inlet and the other stream(s) are introduced into the reaction zone along the reactor, usually within the region of peak temperature. Solvents such as aliphatic hydrocarbons or hydrocarbon mixtures, benzene, or toluene may be present in the reaction mixture, but the solvent-free process has proven particularly useful.

Film produced from the novel copolymers combines excellent optical properties with excellent mechanical properties. In particular, the toughness and Shore hardness are distinctly improved compared to conventional film composed of ethylene/vinyl acetate copolymers. Moreover, the film of the invention has a higher Vicat softening point. Printing inks adhere very firmly and the printed image is crisp and distinct.

The film is preferably produced by the familiar blown-film extrusion process. In a screw extruder, the copolymer in powder or granular form is melted, devolatilized, homogenized, and extruded through a ring die as a tube. Between the die and a nip device arranged at a certain distance from the die, the tube is blown up by a gas, preferably air, until the desired film thickness is obtained. Downstream of the nip device the tube is wound up and, if desired, slit. The film may contain customary additives and ancillaries, such as antioxidants, light stabilizers, lubricants, antiblocking agents, organic dyes, inorganic pigments, fillers, and antistatic agents.

The Examples which follow illustrate the invention but do not limit it. The material properties are determined using the following methods:

Melt flow index MFI (190/2.16) in g/10 min; measured according to DIN 53735.

Impact tensile toughness (abbreviated to: ITT) in $mJ/mm^2$; measured according to DIN 53448.

Shore hardness (abbreviated to: Shore); measured according to DIN 53505

Vicat softening point (abbreviated to: Vicat) in °C.; measured according to DIN 53 460 (method A/10N)

Haze; measured according to ASTM D 1003

Gloss; measured according to ASTM D 2457.

The ester content is determined by pyrolyzing the copolymers at 450° C. within an enclosed system. The acetic acid liberated from the vinyl acetate is absorbed in water and the tertiary carboxylic acid is extracted with toluene. The two acids are titrated separately with aqueous iodide/iodate solution.

EXAMPLES 1 TO 9

Examples 1 to 6 concern the novel copolymers, while Examples 7 to 9 are comparisons with the prior art ethylene/vinyl acetate copolymers.

The copolymers are prepared in a continuously operating autoclave equipped with a stirrer and connected on the downstream side to a high pressure gas separator and a low pressure gas separator. The monomer mixture to be polymerized is brought to the desired pressure and passed into the autoclave. At the same time the amount of polymerization initiator, bis(2-ethylhexyl)peroxydicarbonate (hereinafter PO), required to maintain the polymerization is added in the form of a solution in gasoline. The residence time of the reaction mixture in the autoclave is about 50 seconds.

The copolymers are processed on a blown-film unit. The throughput is 7 kg/hour, the dimensions of the ring die are 50×1 mm, and the blow-up ratio is 2.5:1. The reaction conditions, the initiator concentration (based on ethylene used), and the composition and properties of the copolymers are set forth in the Table.

The copolymers of Examples 1 to 6 according to the invention are superior to the comparative copolymers of Examples 7 to 9 in having an appreciably increased impact tensile toughness and Shore hardness, a distinctly raised Vicat softening point, and markedly improved gloss values. They are, therefore, particularly suitable for producing film.

While only a limited number of specific embodiments of the present invention have been expressly disclosed, it is, nonetheless, to be broadly construed and not to be limited except by the character of the claims appended hereto.

TABLE

| Example | Pressure MPa | Temp. °C. | PO ppm | Moderator wt. % | Vinyl ester[1] wt. % | VA[2] wt. % | MFI 190/2.16 | d g/cm$^3$ | ITT mJ/mm$^2$ | Shore A/D | Vicat °C. | Haze % | Gloss % |
|---|---|---|---|---|---|---|---|---|---|---|---|---|---|
| 1 | 240 | 200 | 6 | 0.3 | 7.2 | — | 2.9 | 0.925 | 1700 | 98/49 | 110 | 12 | 55 |

TABLE-continued

| Example | Pressure MPa | Temp. °C. | PO ppm | Moderator wt. % | Vinyl ester[1] wt. % | VA[2] wt. % | MFI 190/2.16 | d g/cm³ | ITT mJ/mm² | Shore A/D | Vicat °C. | Haze % | Gloss % |
|---|---|---|---|---|---|---|---|---|---|---|---|---|---|
| 2 | | | 15 | 0.1 | 17.3 | — | 1.3 | 0.920 | 2100 | 95/40 | 90 | 10 | 50 |
| 3 | | | 35 | 0.1 | 27.0 | — | 1.6 | 0.918 | 2300 | 93/38 | 65 | 13 | 45 |
| 4 | | | 48 | — | 34.5 | — | 2.0 | 0.917 | 2400 | 85/33 | 63 | 12 | 45 |
| 5 | | | 28 | — | 20.8 | 10.1 | 1.5 | 0.921 | 2450 | 90/34 | 60 | 8 | 60 |
| 6 | 220 | | 42 | — | 30.0 | — | 1.2 | 0.917 | 2500 | 86/32 | 62 | 3 | 75 |
| 7 | 240 | | 8 | 0.4 | — | 7.0 | 2.1 | 0.925 | 1300 | 95/39 | 85 | 12 | 41 |
| 8 | | | 16 | 0.2 | — | 17.0 | 1.7 | 0.937 | 1700 | 89/29 | 65 | 11 | 47 |
| 9 | | | 29 | — | — | 27.0 | 2.7 | 0.952 | 1750 | 76/26 | 42 | 8 | 56 |

[1]Examples 1 to 5: vinyl neononanate
Example 6: vinyl neodecanoate
[2]Vinyl acetate

What we claim is:

1. A copolymer comprising ethylene and a vinyl ester of a saturated tertiary monocarboxylic acid, said copolymer having a melt flow index (190/2.16) of 0.1 to 50 g/10 min, and a Vicat Softening Point of 90° to 110° C., said copolymer comprising 3% to 50% by weight of said vinyl ester.

2. The copolymer of claim 1 containing 5% to 30% by weight, based on said copolymer, of a further copolymerizable monomer.

3. The copolymer of claim 1 wherein said tertiary monocarboxylic acid is selected from the group consisting of 2,2-dimethylpropionic acid; 2,2-dimethylheptanoic acid; and 2,2-dimethyloctanoic acid.

4. The copolymer of claim 1 wherein said vinyl ester is present in an ester amount of 5% to 35% by weight.

5. The copolymer of claim 4 wherein said vinyl ester amount is 7% to 30% by weight.

6. The copolymer of claim 2 wherein said monomer is selected from the group consisting of unbranched saturated monocarboxylic acids, alkenecarboxylic acids, and alkenecarboxylic esters of saturated aliphatic alcohols, which alcohols have 1 to 8 carbon atoms.

7. The copolymer of claim 6 wherein said monomer is selected from the group consisting of vinyl acetate, vinyl propionate, acrylic acid, methyl acrylate, ethyl acrylate, n-butyl acrylate, i-butyl acrylate, and 2-ethylhexyl acrylate.

8. The copolymer of claim 2 wherein said tertiary monocarboxylic acid is selected from the group consisting of 2,2-dimethylpropionic acid; 2,2-dimethylheptanoic acid; and 2,2-dimethyloctanoic acid.

9. The copolymer of claim 2 wherein said vinyl ester is present in an ester amount of 5% to 35% by weight.

10. The copolymer of claim 9 wherein said vinyl ester amount is 7% to 30% by weight.

* * * * *